United States Patent [19]
Kasugai et al.

[11] Patent Number: 5,529,086
[45] Date of Patent: Jun. 25, 1996

[54] FLOAT VALVE FOR USE IN FUEL TANK

[75] Inventors: Joji Kasugai, Ichinomiya; Yoshihiro Nagino, Inazawa; Hiroshi Nishi, Nagoya, all of Japan

[73] Assignee: Toyoda Gosei Co., Ltd., Japan

[21] Appl. No.: 425,627

[22] Filed: Apr. 20, 1995

[30]  Foreign Application Priority Data

Apr. 28, 1994 [JP] Japan .................................. 6-091569
Apr. 28, 1994 [JP] Japan .................................. 6-091581

[51] Int. Cl.⁶ .................................................. F16K 31/18
[52] U.S. Cl. ............................ 137/202; 137/43; 137/587
[58] Field of Search ............................ 137/43, 202, 587

[56] References Cited

U.S. PATENT DOCUMENTS 4,000,828  1/1977  Crute et al. .
4,679,581  7/1987  Mears .
4,905,726  3/1990  Kasugai et al. .
4,913,303  4/1990  Harris .
5,028,244  7/1991  Szlaga .
5,156,178  10/1992  Harris .

FOREIGN PATENT DOCUMENTS 4-39061  9/1992  Japan .
5-185850  7/1993  Japan .

*Primary Examiner*—Gerald A. Michalsky
*Attorney, Agent, or Firm*—Cushman Darby & Cushman

[57]  ABSTRACT

A float valve for use in a fuel tank, having a float for regulating air flow out of an air outflow channel provided in an upper portion of the fuel tank. An air flow deflecting portion provided on the float prevents the float from being lifted as air and fuel vapors displaced when the fuel tank is filled-up escape the tank. When the fuel level in the tank rises to a filled-up position, the outflow of air is stopped by the float.

11 Claims, 9 Drawing Sheets

FLOAT VALVE FOR USE IN FUEL TANK

BACKGROUND OF THE INVENTION

1. Field of the Invention

This invention relates to a float valve for use in a fuel tank, placed in an upper portion of the fuel tank and connected to an air outflow channel, for allowing air to flow from the fuel tank when refueled, and for stopping the outflow of air when the level of fuel rises to a filled-up position.

2. Description of the Related Art

Conventional float valves placed in a fuel tank are disclosed in, for example, Japanese Unexamined Patent Publication No. 5-185850/1993 and Japanese Examined Utility Model Publication No. 4-39061/1992 and have a structure as illustrated in FIG. 1 (Prior Art).

The float valve V0 has a float 5 inserted in a closed-bottomed cylindrical casing 1 which is fixed to a top wall 9A of a fuel tank 8A. The casing 1 has a ceiling wall 2, a bottom wall 3 located under the ceiling wall 2, and a side wall 4 connecting the ceiling wall 2 with the bottom wall 3. A communicating hole 2a providing communication with an outflow channel 7A is bored through ceiling wall 2.

A through hole 3a and an air hole 4a are formed in the bottom wall 3 and the side wall 4, respectively, so as to permit fuel F and air A, respectively, to flow into then casing 1.

A valve portion 5a formed on the top of the float 5 is capable of blocking the flow of air to outflow channel 7A. A compression coil spring 6 is located between the float 5 and the bottom wall 3 of the casing 1.

The compression spring 6 is a biasing means for biasing the float 5 to block the communicating hole 2a when the vehicle is inclined or overturned. Namely, when the vehicle is overturned, the communicating hole 2a is positioned under the float 5. At that time, the spring constant of the spring 6 is set so that the sum of the mass of the float 5 and the force of the spring 6 is larger than the buoyant force of the float 5. Nevertheless, the spring constant of the spring 6 is set in a range so that the float 5 is not raised and the communication hole 2a is not blocked before the level of the fuel F rises when the vehicle is upright. The sum of the buoyant force of the float 5 and the force of the spring 6 is larger than the mass of the float 5 when the float 5 is immersed in fuel F.

It is usual in such a float valve V0 that if the level of the fuel F contained in the fuel tank 8A rises, the fuel F flows into the casing 1 by way of the through hole 3a, and displaced air and fuel vapors enter through the air hole 4a. As a result, the float 5 rises. Thus the valve portion 5a blocks the communicating hole 2a, and the fuel F can be prevented from flowing from the tank 8A. Air which flows through the communicating hole 2a and the air outflow channel 7A is sent to a canister (not shown).

In the case of a fuel tank 8A using the conventional float valve V0, when refueling, a large amount of the fuel F is put into the fuel tank 8A in a short time. This causes the following problem.

Specifically, when refueling, the air A flows rapidly into the casing 1 from the air hole 4a. Thus the velocity of the flow of the air A flowing into the air outflow channel 7A becomes high. Consequently, the flow of the air A provides lift and operates to lift the float 5. Further, when the fuel F flows into the casing 1 from the through hole 3a the float 5 is further lifted by the buoyant force due to the fuel F. Thus the flow of the air A sometimes causes the valve portion 5a to block the communicating hole 2a before the surface or level of the fuel F rises to a filled-up tank position LF. This inappropriate valve closing operation is apt to occur especially when the buoyant force owing to the fuel F is exerted on the float 5, because the downward force on the float 5 is small (namely, the value obtained by subtracting the buoyant force and the spring force from the mass is small).

Further, when the valve closes inappropriately, the air A normally discharged from the fuel tank 8A remains in the tank 8A. Thus the mechanism for automatically stopping a fuel injection gun injecting fuel into the fuel tank 8A is actuated when the fuel level at the fuel inlet rises. Consequently, an inappropriate valve closing operation interferes with filling up the fuel tank.

Moreover, such inappropriate valve closing is liable to occur where the refueling speed is high, namely, where the amount of fuel flow is great, because the resulting flow of the air A is thus also great.

SUMMARY OF THE INVENTION

The present invention is created to resolve the aforementioned problem of the conventional float valve.

Accordingly, an object of the present invention is to provide a float valve for use in a fuel tank, through which air can be made to smoothly and uninterruptedly flow from a fuel tank when the tank is being filled up until the level of fuel reaches a filled-up position.

In accordance with a first embodiment, the invention provides a float valve disposed in a top of a fuel tank, for allowing air and fuel vapors displaced by fuel entering the tank during refilling to escape the tank via an outflow channel, and for preventing air and fuel vapors from flowing out of the tank when the fuel in the tank reaches a predetermined filled-up level. The float valve comprises (1) an air passage for directing air and fuel vapors displaced from the fuel tank to a communicating hole providing communication with the outflow channel; and (2) a float disposed between the air passage and the communicating hole, having a valve portion for blocking the communicating hole, and an air flow deflecting portion for deflecting air flowing from the air passage to the communicating hole so as to prevent the float from being floated upward.

Preferably, the float valve comprises (1) a casing and (2) a float. The casing is fixed to a top of the fuel tank, and has (a) a ceiling wall with a communicating hole formed therein providing communication with the air outflow channel, (b) a bottom wall disposed under the ceiling wall, with a through hole formed therein for allowing fuel to enter the casing, and (c) a side wall connecting the ceiling wall with the bottom wall, with an air hole formed therein for allowing air and fuel vapors to enter the casing. The float is movably disposed in the casing, and has (a) a valve portion constructed to block the communicating hole when the float is floated upward, and (b) an air deflecting portion facing the air hole to deflect air upward and force the float downward.

In accordance with a second embodiment, the float further comprises a first float portion defining a chamber therein, having a top containing the valve portion, having a side with an air hole therein for allowing air to enter the chamber, and having a through hole therein for allowing fuel to enter the chamber. A second float portion is movably-contained in the chamber. A relief valve is disposed in the valve portion and regulates communication between the outflow channel and the chamber when the valve portion blocks the communicating hole.

In accordance with third and fourth embodiments of the invention, the float valve comprises (1) a casing, (2) a nipple, (3) a regulation portion and (4) a float. The casing is fixed to the top of the fuel tank, and has (a) a ceiling wall, having an outer circumferential edge portion, and having a communicating hole formed therein communicating between the casing and the outflow channel, (b) a bottom wall, disposed under the ceiling wall, and having a through hole formed therein, and (c) a substantially cylindrical side wall connecting the ceiling wall to the bottom wall, having an upper end, and (d) a flange portion between the ceiling wall and side wall, extending outwards from a circumference of the upper end of the side wall. The flange portion has an air hole therein and is connected to the ceiling wall. The downwardly extending nipple has a diameter and a bottom end and extends into the casing from the communicating hole. The cylindrical regulation portion, disposed around the entire circumference of the upper end of the side wall, has a diameter greater than the diameter of the nipple, and projects upwardly from the side wall and the flange past the bottom end of the nipple. The float is disposed inside the casing has a top surface, and a valve portion disposed to block the nipple when the float is raised.

Preferably, the top surface of the float comprises a cylindrical rib having a diameter greater than the diameter of the nipple, and a tapered surface which defines a dish-shaped cavity in the top surface. The tapered surface of the regulation portion and the cylindrical rib are preferrably defined by a section of an inverted cone.

Accordingly, in the case of the float valve of the present invention, when the fuel tank is filled up with fuel, the air can be made to flow smoothly and uninterruptedly from the fuel tank until the fuel level reaches a filled-up position.

Further objects, features and advantages of the present invention will become apparent from the Detailed Description of Preferred Embodiments which follows, when considered together with the attached drawings.

BRIEF DESCRIPTION OF THE DRAWINGS

Other features, objects and advantages of the present invention will become apparent from the following description of preferred embodiments with reference to the drawings in which like reference characters designate like or corresponding parts through the several views.

DETAILED DESCRIPTION OF THE PREFERRED EMBODIMENTS

Hereinafter, the preferred embodiments of the present invention will be described in detail by referring to the accompanying drawings.

Figure 1:
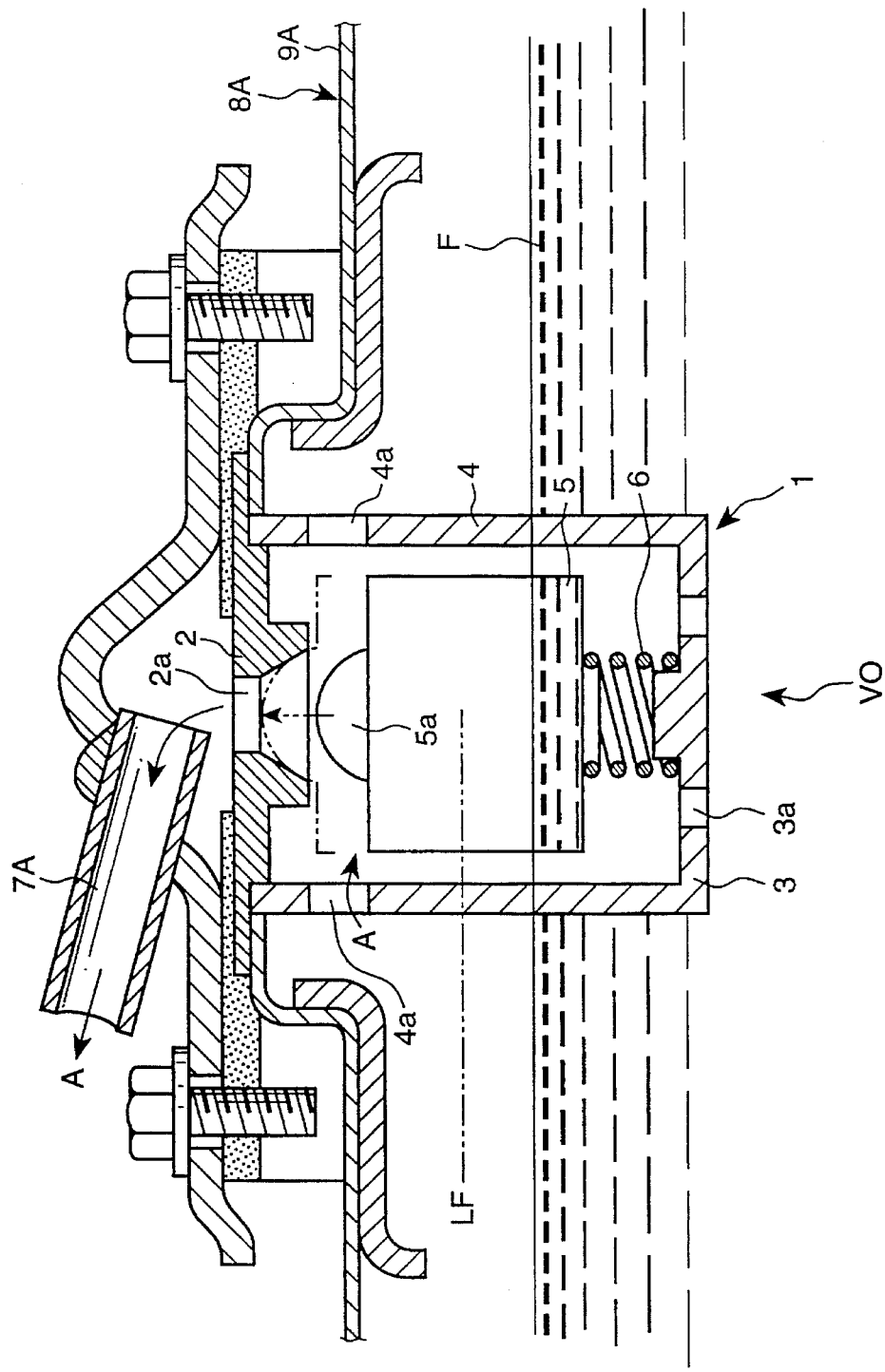
FIG. 1 (Prior Art) is a sectional view of a conventional float valve.
Figure 2:
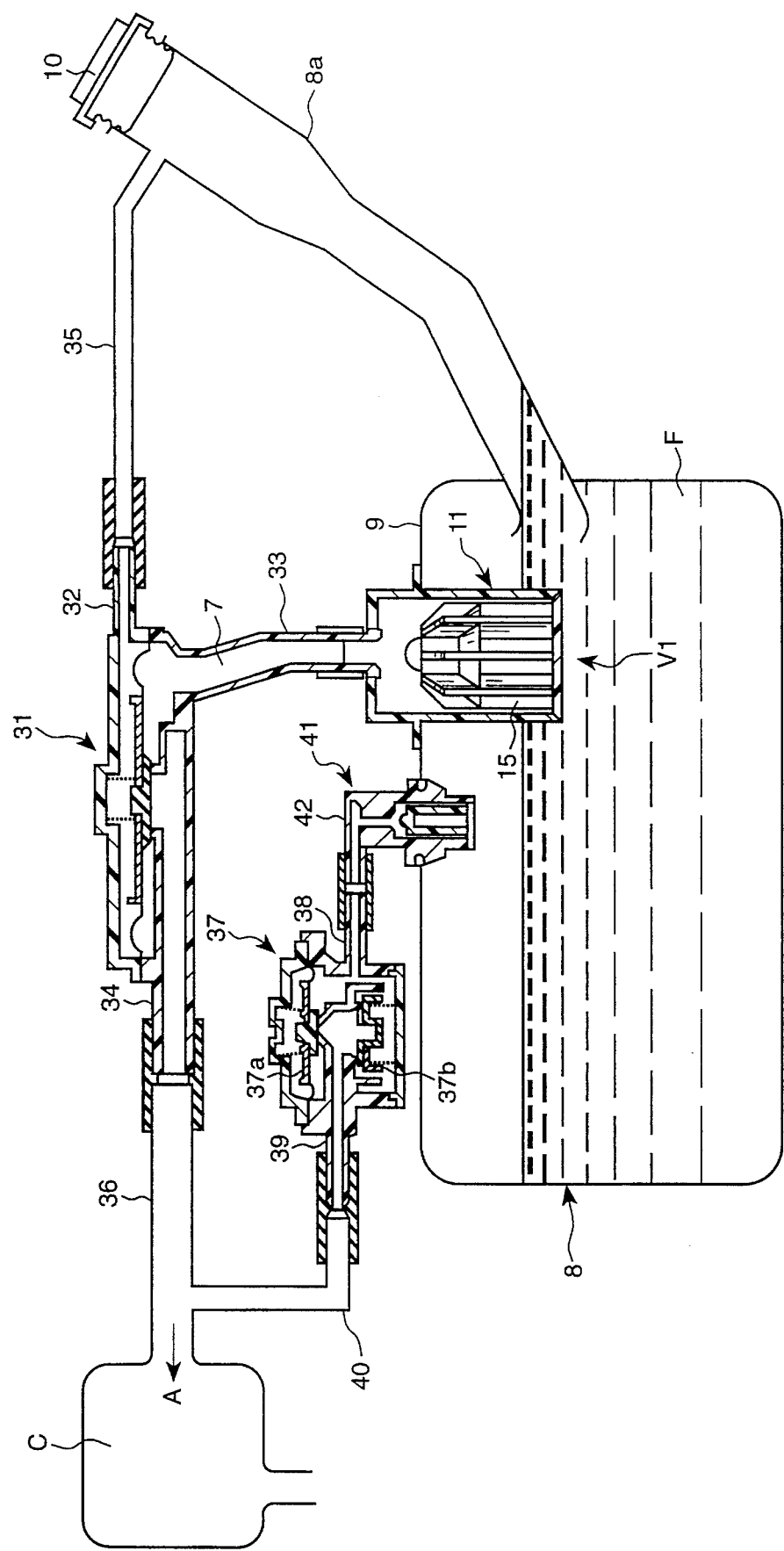
FIG. 2 is a partial sectional view of a fuel system in which a first embodiment of a float valve embodying the present invention is placed in a fuel tank.

As illustrated in FIG. 2, a float valve V1 for use in a fuel tank 8 is fixedly mounted on the top wall 9 of fuel tank 8. Further, the float valve V1 allows a large amount of air A, containing a large quantity of fuel vapor or gas generated at the time of refueling, to flow from tank 8 to a canister C. A differential pressure control valve 31 is provided at a point located midway between valve V1, which is connected to an air outflow channel 7, and the canister C. The differential pressure control valve 31 incorporates a diaphragm valve. The differential pressure control valve 31 is coupled through a nipple 32 to a pipe 35 connected with a filler pipe 8a to be used as a fuel inlet for the fuel tank 8. Filler pipe 8a is provided with a cap assembly 10 for capping the pipe 8a when tank 8 is not being refueled. A nipple 33 is coupled to the float valve V1. A nipple, 34 is coupled to a pipe 36 connected with the canister C. When refueling, the internal pressure of the nipple 33 becomes higher than that of the pipe 35. Thus the differential pressure valve 31 opens so as to provide communication between the nipples 33 and 34. Consequently, the fuel gas generated at the time of refueling flows out through the air outflow channel 7 to the canister C.

Another float valve 41, provided on the top wall 9 of the fuel tank 8, allows a small amount of air A containing fuel vapors generated at times other than refueling, to flow to the canister C. Float valve 41 is connected to a nipple 38 of a positive-and-negative-pressure valve 37 by means of a nipple 42. The positive-and-negative-pressure valve 37 is connected by means of a nipple 39 to a pipe 40 communicating with the canister C. Valve 37 is provided with a positive pressure valve 37a and a negative pressure valve 37b. The valve opening pressure of the positive pressure valve 37a is set to be higher than that of the differential pressure valve 31. Thus, there is no pressure differential between fuel tank 8 and pipe 35. Consequently, the differential pressure valve 31 does not open during refueling. If the pressure in the fuel tank 8 becomes higher than a predetermined value, the positive pressure valve 37a opens to let the air A flow to the canister C. On the other hand, if the fuel tank 8 comes to have a negative pressure lower than a predetermined value, the negative pressure valve 37b opens.

In addition, a fuel feeding pipe on the side of an engine (not shown) and a fuel return pipe for returning the fuel F (not shown) are also connected to the fuel tank 8.

Figure 3:
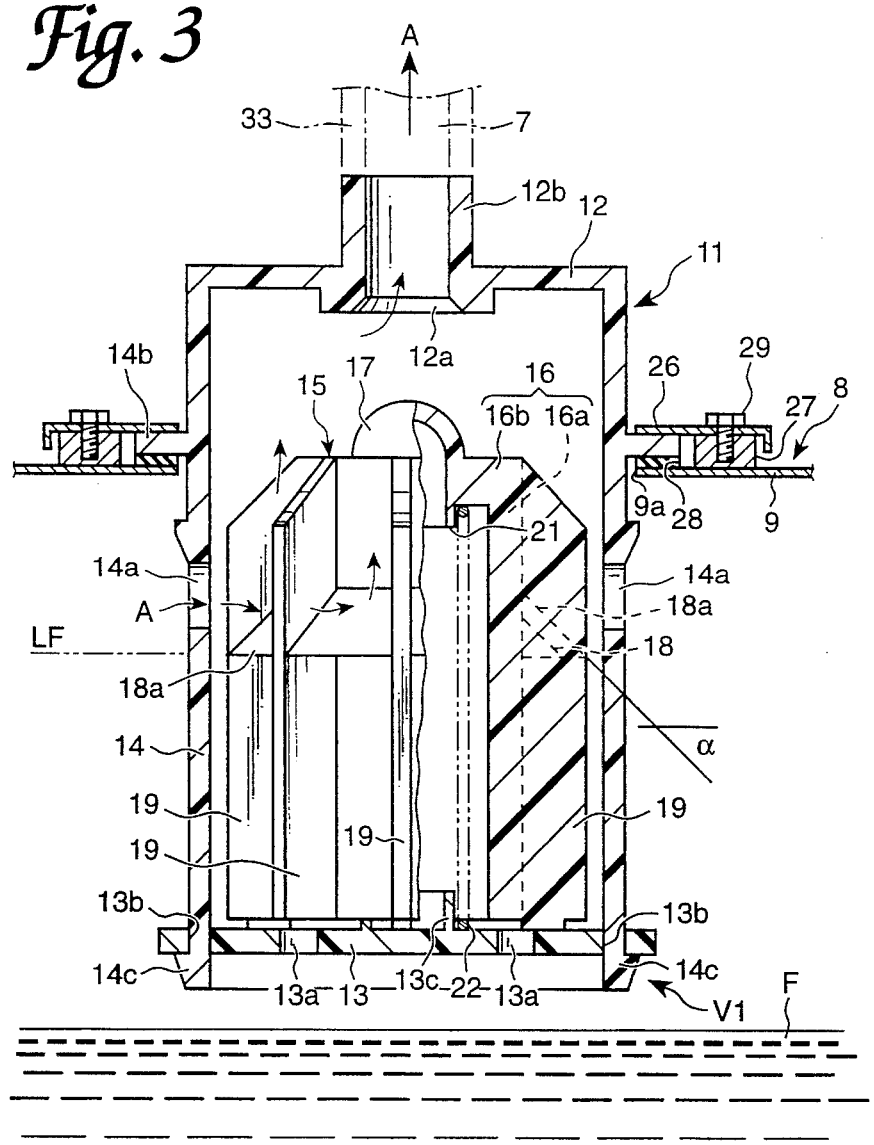
FIG. 3 is a sectional view of the first embodiment of the present invention.

As illustrated in FIGS. 2 and 3, the float valve of the first embodiment is provided with a substantially cylindrical casing 11 fixed on the top wall 9 of the fuel tank. The casing 11 is made of fuel-oil-resistant synthetic resin such as polyacetal and polyamide and consists of a substantially disk-like ceiling wall 12, a substantially disk-like bottom wall 13 placed under the ceiling wall 12, and a substantially cylindrical side wall 14 connecting the periphery of the ceiling wall 12 with that of the bottom wall 13.

A communication hole 12a communicating with the air outflow channel 7 is formed in the central portion of the ceiling wall 12. An upwardly extending nipple 12b is formed on the circumferential edge portion of the communicating hole 12a. This nipple 12b is connected with a nipple 33 of the differential pressure control valve 31.

A plurality of through holes 13a are bored in the bottom wall 13. A plurality of engaging holes 13b are bored in the vicinity of the outer circumferential edge portion of the bottom wall 13. This bottom wall 13 is formed separately from the ceiling wall 12 and the side wall 14 in order facilitate making forming dies for the casing and to enable incorporation of a float 15 (to be described later). The bottom wall 13 is connected with side wall 14 by a plurality of engaging legs 14c which protrude from a lower portion of side wall 14 and engage engaging holes 13b. A protruding rib 13c is formed on the central portion of the top surface of the bottom wall 13.

A flange 14b projects from the upper outer circumferential surface of the side wall 14. The flange 14b is brought into abutting engagement with the circumferential edge portion of a through hole 9a in the top wall 9 of the fuel tank by way of an annular gasket 28. The top surface of the flange 14b is pressed down by a substantially annular metallic clamp 26 which is fastened with bolts 29 to an annular mouth piece 27 fixed to the circumferential edge portion of the through hole 9a. The flange 14b is thus mounted on the top wall 9 of the fuel tank 8, and the casing 11 is thereby secured to tank 8.

A plurality of air holes 14a are bored horizontally in a part of the side wall 14. The position of holes 14a is higher than an appropriate filled-up level or position LF of the fuel when the casing 11 is fixed to the fuel tank 8.

A float 15 capable of blocking the communicating hole 12a is movably disposed in the casing 11. The float 15 is made of fuel-oil-resistant synthetic resin such as polyacetal and polyamide. Further, a hemispherical valve portion 17 capable of being brought into abutting engagement with the inner circumferential surface of the air hole 12a is formed on a body 16 of the float. The body 16 comprises a cylindrical portion 16a and a top portion 16b from which the valve portion 17 projects.

Figure 4:
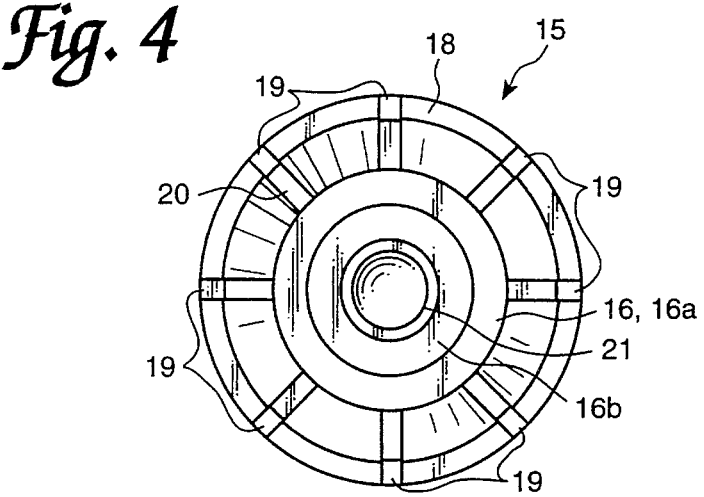
FIG. 4 is a bottom plan view of a float according to the first embodiment of the invention.

As shown in FIGS. 3 and 4, a plurality of umbrella-like, tapered air deflecting portions 18, each of which has a downwardly inclined face 18a, are formed on the outer circumferential surface of the cylindrical portion 16a of the body 16 of the float 15. Each of the air deflecting portions 18 is located at a position facing a corresponding air hole 14a. In this embodiment, an angle α made by the inclined face 18a with respect to the horizontal is 45 degrees.

A plurality of vertically-extending ribs 19 are formed to protrude from the outer circumferential surface of the cylindrical portion 16a of the body of the float 15. A plurality of supporting legs 20 are formed on the bottom surface of the cylindrical portion 16a of the body 16 of the float.

A compression coil spring 22 is provided between the float 15 and the bottom wall 13. A cylindrical supporting rib 21, which protrudes from the bottom surface of the top portion 16b of the body 16, supports a top part of spring 22; and a supporting rib 13c, formed on the bottom wall 13, supports lower part of spring 22. Coil spring 22 is a biasing member for biasing the float in a direction to block the communicating hole 12a when the vehicle is inclined or overturned (upward in FIG. 5).

When putting the fuel F into the fuel tank 8 provided with the float valve V1 of the first embodiment, the cap 10 of the fuel inlet and filler pipe 8a is first removed, and a fuel injection gun (not shown) is inserted into the filler pipe 8. The fuel F is filled from the fuel injection gun into the fuel tank 8.

When putting the fuel F into the tank, the fuel level rises in the fuel tank 8. As a result, the air A contained in the fuel tank 8 is displaced and flows into the casing 11 through the air hole 14a bored in the side wall 14. Then, the air A flows out to the air outflow channel 7 through the communication hole 12a bored in the ceiling wall 12. The air A flows horizontally into the casing 11 through air hole 14a and blows on the downwardly-inclined face 18a of the air-deflecting portion 18. Thereafter, the air A flows upward into the communicating hole 12a bored in the ceiling wall 12.

Figure 5:
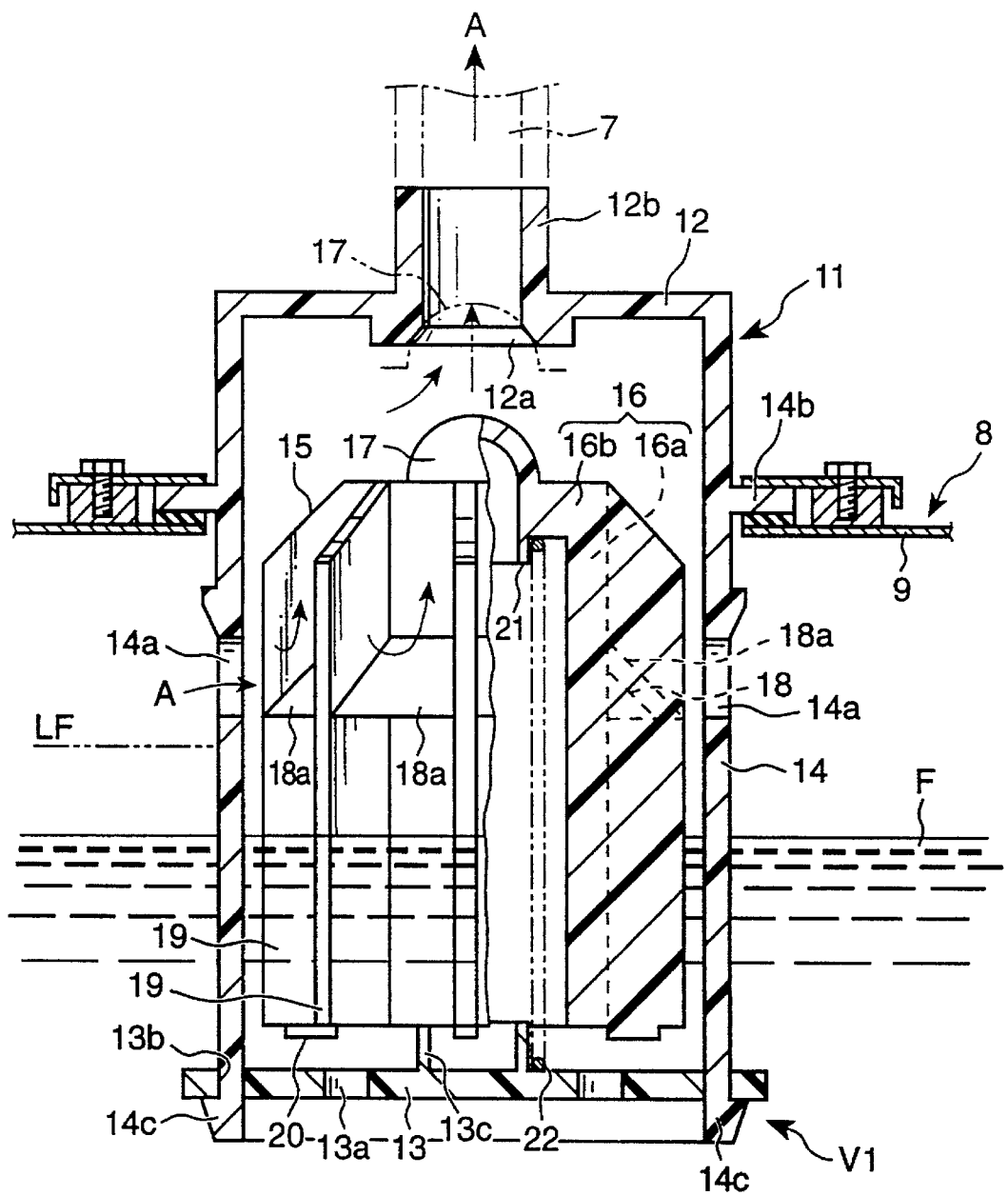
FIG. 5 is another sectional view of the first embodiment of the present invention for illustrating how the first embodiment of the present invention is used.

The float 15 is thus subjected to a downward force when air A blows on the inclined face 18a. Thus, even when the fuel F flows into the casing 11 through the through hole 13a bored in the bottom wall 13 as illustrated in FIG. 5, and a buoyant force is generated, the float is prevented from being lifted up by the air A.

As the refueling speed increases, the velocity of the flow of air A increases and thus the force preventing the float A from being lifted up also increases. Therefore, even if a strong buoyant force is generated, the float 15 can meet or overcome it.

When the fuel level reaches the filled-up position LF, the float 15 is still acted upon downwardly by the air but is raised by the stronger buoyant force. As a result, the communicating hole 12a bored in the ceiling wall 12 is blocked up by the valve portion 17. Thereafter the air A stops flowing out from the fuel tank 8. The internal pressure of the fuel tank 8 then rises to a certain constant value, and, subsequently, a mechanism for automatically stopping the fuel injection gun on the side of the filler pipe 8a is actuated and the refueling operation stops when the fuel level on the filler pipe 8a rises.

Accordingly, in the case of the float valve V1 of the first embodiment, when the fuel tank 8 is filled up with fuel, the air A can be made to uninterruptedly flow from the fuel tank until the fuel level reaches a predetermined, filled-up level. The filling-up of the fuel tank can thus be smoothly achieved.

The angle α determined by the inclined face 18a of the air-deflecting portion 18 formed on the float 15 and the horizontal plane is 45 degrees in this embodiment. The angle α, however, may vary within a range from 20 to 70 degrees.

It is most preferable to employ the angle α of 45 degrees as in this embodiment, because a good balance between the downward force exerted from the flow of the air A on the float 15 and the sum of the buoyant force can be obtained even when the refueling speed is changed.

Figure 6:
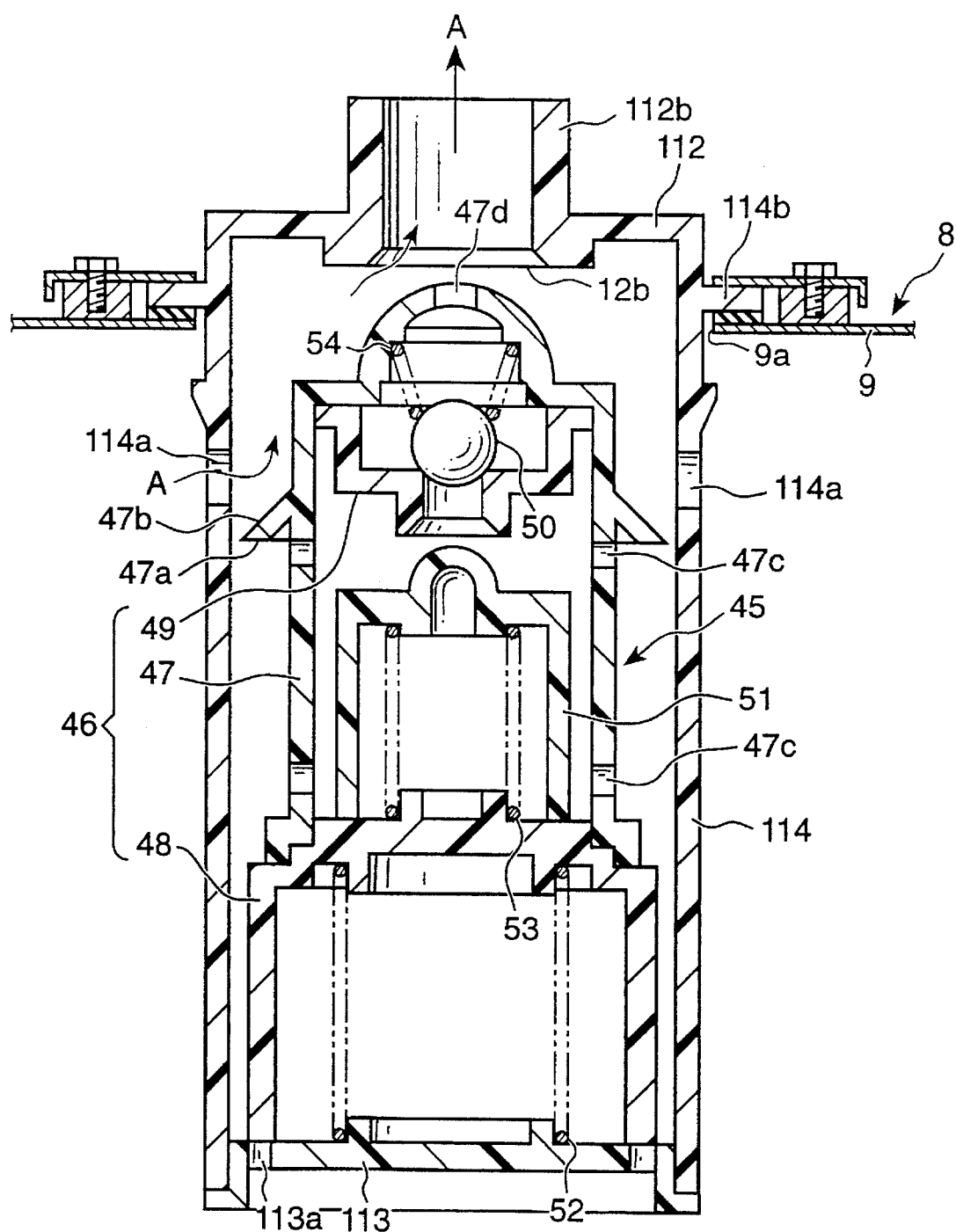
FIG. 6 is a sectional view of a second embodiment of the present invention.

As illustrated in FIG. 6, the float provided in the casing 11 may be configured according to a second embodiment. The float 45 of the second embodiment has a first float portion 46 and a second float portion 51 placed in the first float portion 46. Both portions 46, 47 are made of fuel-oil-resistant synthetic resin such as polyacetal and polyamide.

The first float portion 46 is composed of a body part 47, a bottom part 48 welded to the bottom of the body part 47 and an inner part 49 welded to an inner surface of a top wall of the body part 47. The bottom part, the top part and the inner part define a chamber for movably containing the second float portion 51. A relief valve 50 for preventing an abrupt increase in the internal pressure of the fuel tank 8 is located between the top wall of the body part 47 and the inner part 49. Umbrella-like, tapered, air-deflecting parts 47a are formed on the outer circumferential surface of the body part 47. Each part 47a has an inclined face 47b facing a corresponding air hole 14a.

Reference character 47c designates air passages and through holes for the second float portion; and 47d is a through hole for the relief valve. Reference numerals 52 and 53 denote springs which serve as biasing members for biasing the first and second float portions 46 and 51 in the direction of blocking the communicating hole 12b when the vehicle is inclined or overturned (upward in FIG. 6). Reference numeral 54 designates a spring for actuating the relief valve 50.

Figure 7:
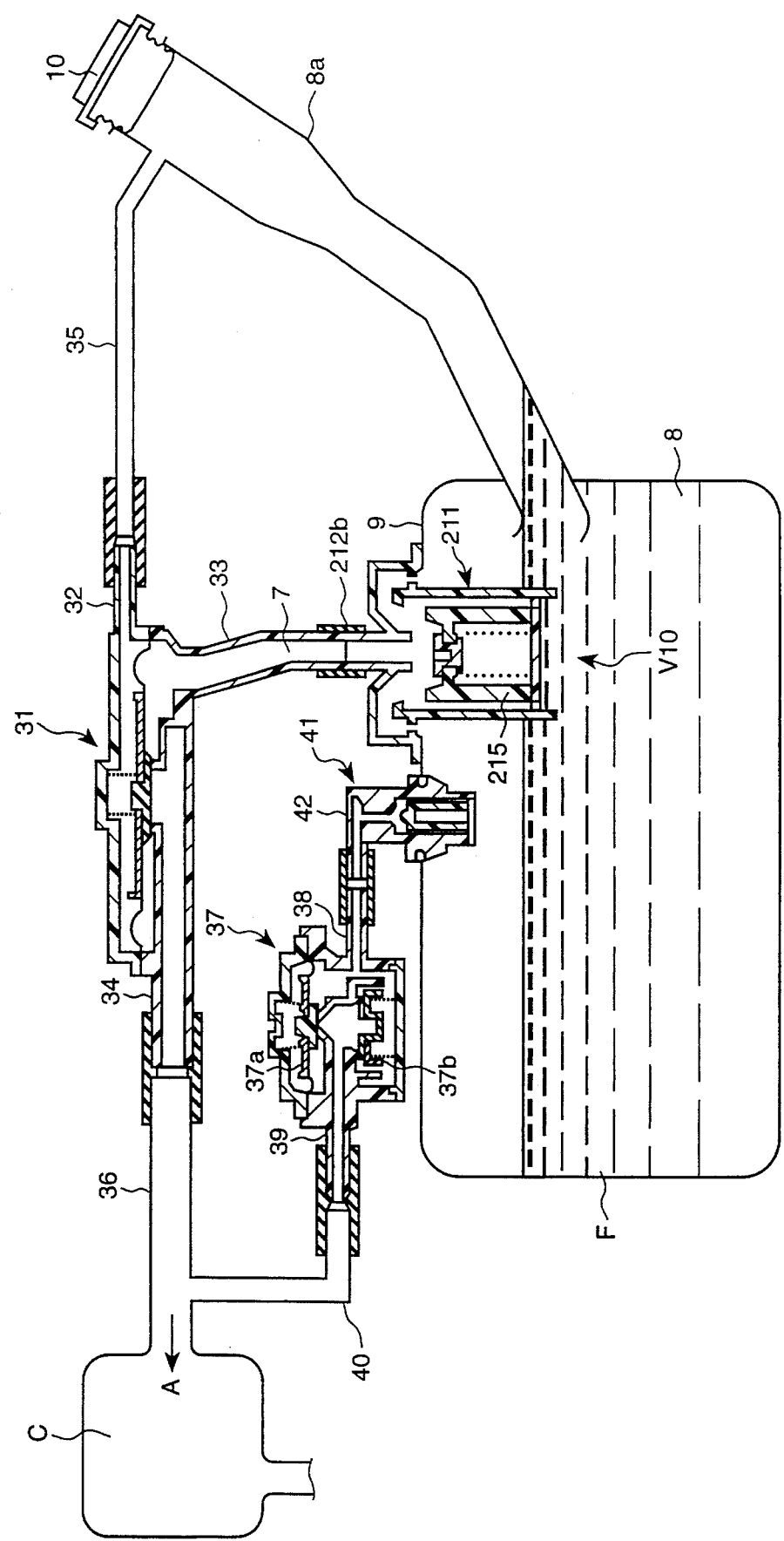
FIG. 7 is a partial sectional view of a fuel system incorporating a float valve according to a third embodiment of the present invention.
Figure 8:
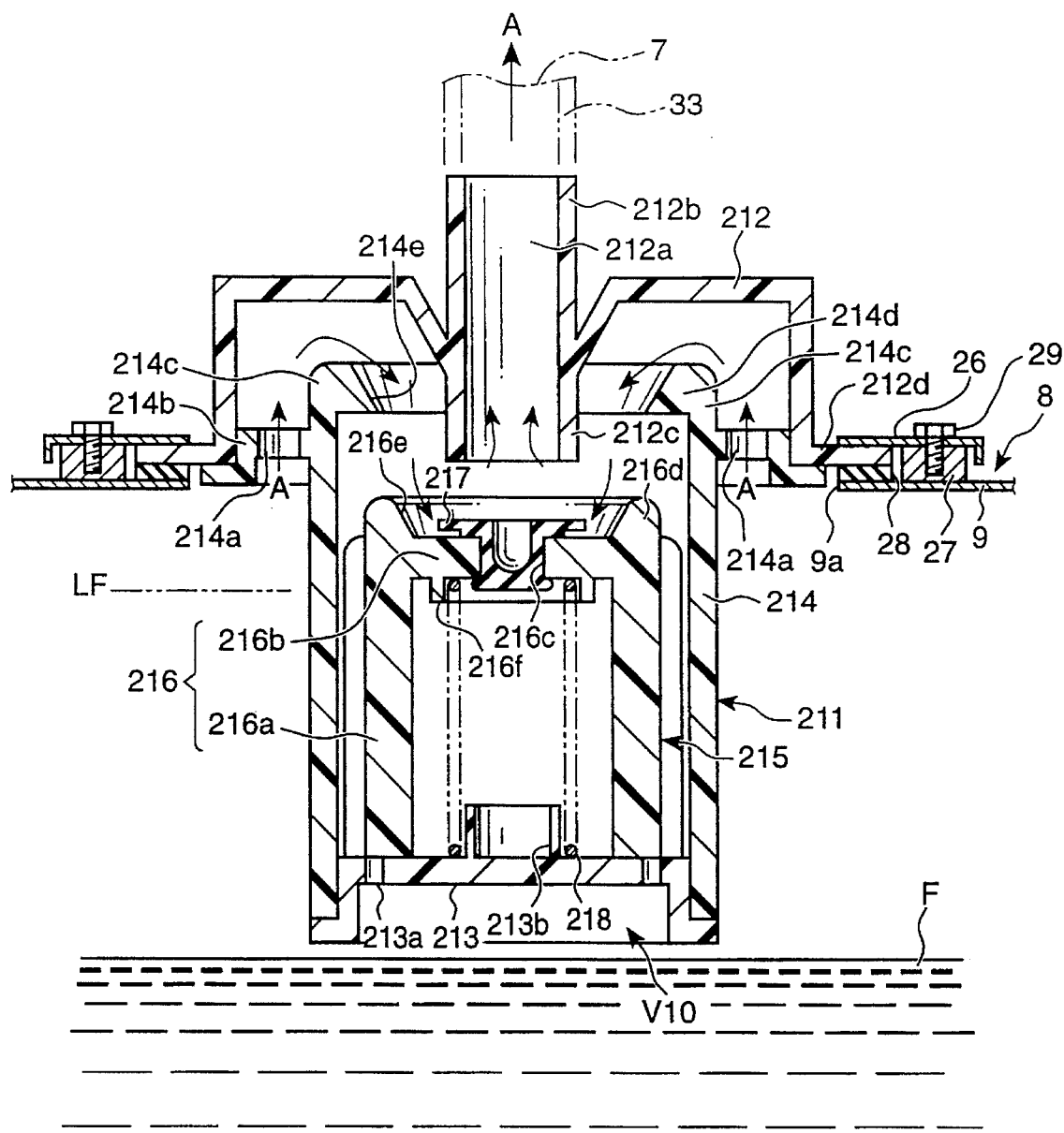
FIG. 8 is a sectional view of the third embodiment of the present invention.
Figure 9:
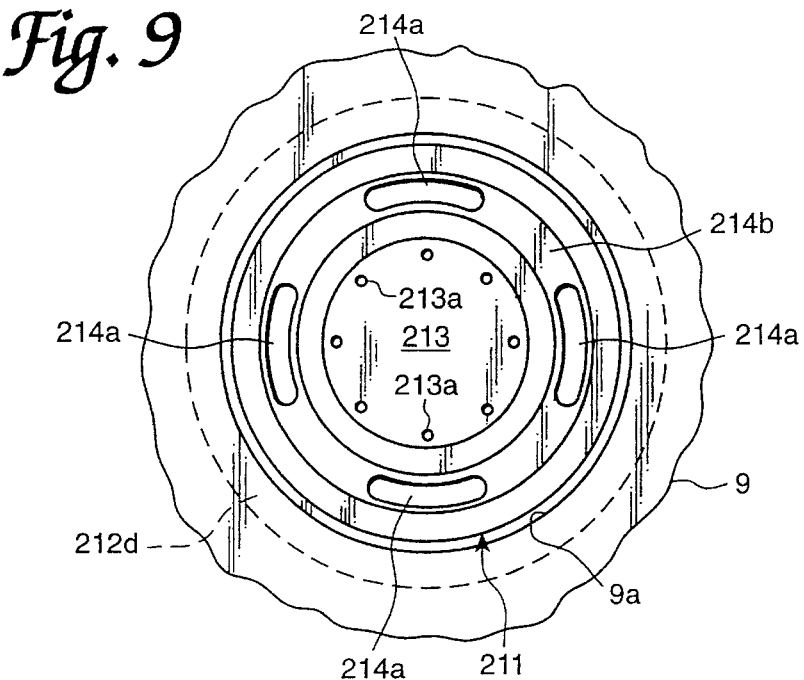
FIG. 9 is a bottom view of the third embodiment of the present invention placed in the fuel tank.

FIGS. 7 to 9 illustrate a third embodiment of the float valve V10 embodying the present invention. The third embodiment of the present invention is provided with a substantially cylindrical casing 211 fixed on the top wall 9 of the fuel tank. The casing 211 is made of fuel-oil-resistant synthetic resin such as polyacetal and polyamide and has a substantially disk-like ceiling wall 212, a substantially disk-like bottom wall 213 placed under the ceiling wall 212, and a substantially cylindrical side wall 214 formed in such a manner as to connect the circumference of the ceiling wall 212 with that of the bottom wall 213.

A communicating hole 212a communicating with the air outflow channel 7 is formed in an upwardly extending cylindrical nipple 212b and a downwardly extending nipple 212c. Nipples 212b and 212c are provided in a central concave portion of the ceiling wall 212 in such a manner as to protrude upwardly and downwardly, respectively. Nipple 212b is connected with the nipple 33 of the differential pressure control valve 31. On the outer circumferential edge portion of the ceiling wall 212, a flange 212d is formed. Flange 212d extends downwardly and then outwardly. Flange 212d is brought into abutting engagement by means of an annular gasket 28 with the circumferential edge portion of the through hole 9a bored in the top wall 9 of the fuel tank. The top surface of the flange 212d is pressed down by a substantially annular metallic clamp 26 which is fastened with bolts 29 to a ring-like mouth piece 27 fixed to the circumferential edge portion of the through hole 9a. The flange 212d is thus mounted to the top wall 9 of the fuel tank 8, and thereby also the casing 211, as will be explained below.

A plurality of through holes 213a are bored in the bottom wall 213 which is welded to the bottom end of the side wall 214. Cylindrical holding rib 212b for holding a coil spring 218 is formed to protrude from a central portion of the top surface of the bottom wall 213.

A flange 214b is formed to project from the upper outer circumferential surface of the side wall 214. The flange 214b is welded to the inner circumferential surface of the flange 212d of the ceiling wall 212. A plurality of air holes 214a are vertically bored in the flange 214b. The appropriate filled-up oil level or position LF of the fuel when the casing 211 is fixed to the fuel tank 8 is set to be below the air holes 214a.

Around the entire circumference of the top end of the side wall 214, a cylindrical regulation portion 214c is provided so as to protrude upwardly from a height corresponding to the bottom end of the nipple 212c into an opening formed between the bottom surface of the ceiling wall 212 and the top surface of the side wall 214 and flange 214b. A projecting ridge 214d is formed on the entire circumference of the inner surface of the regulation portion 214c. The inner surface of the projecting ridge 214d has a tapered face 214e which narrows toward the bottom like a section of an inverted cone.

A float 215 capable of blocking the communicating hole 212a is provided in the casing 211. The float 215 consists of a body 216, which is made of fuel-oil-resistant synthetic resin such as polyacetal and polyamide, and a valve portion 217 which is made of a rubber material such as fluoro-rubber or nitrile rubber. Valve portion 217 is incorporated into the central portion of the top surface of the body 216 in such a manner as to be able to block the bottom end of the nipple 212c.

The body 216 has a cylindrical portion 216a and a ceiling portion 216b provided so as to close the top end of the cylindrical portion 216a. The outer diameter of the cylindrical portion 216a is larger than that of nipple 212c but is slightly smaller than the inside diameter or bore of the side wall 214. A plurality of vertically extending concave grooves (not shown) are formed on the outer circumferential surface of the cylindrical portion 216a.

A hole 216c for incorporating or inserting the valve portion 217 into the body 216 is formed in the central part of the ceiling portion 216b. A substantially cylindrical rib 216d is formed to protrude upward from the outer circumferential edge part of the top surface of the ceiling portion 216b. Rib 216d has an inner circumferential tapered face 216e which narrows toward the bottom like a section of an inverted cone to define a dish-shaped cavity on the top of float 215. The tapered face 216e corresponds to the aforementioned conical tapered face 214e of the projecting ridge 214d of the regulation portion 214c of the side wall 214.

A compression coil spring 218 is provided between the float 215 and the bottom wall 213. An upper end of spring 218 is held in position by a cylindrical rib 216f protruding from the bottom surface of the ceiling portion 216b of the body 216, and a lower end of spring 218 is held by a holding rib 212b formed on the bottom wall 213. This coil spring 218 is a biasing member for biasing the float 215 in a direction to block the communicating hole 212a when the vehicle is inclined or overturned (upward in FIG. 8).

When putting fuel F into the fuel tank 8 provided with the float valve V10 of this third embodiment, a filler cap 10 of the fuel inlet and filler pipe 8a is first removed and a fuel injection gun (not shown) is then inserted into the filler pipe 8a. The fuel F is thereafter filled from the fuel injection gun into the fuel tank 8.

As the fuel F is filled into the tank 8, the fuel level rises and the air A contained in the fuel tank 8 is displaced and flows into the casing 211 from the air hole 214a bored in the side wall 214. Then, the air A flows out to the air outflow channel 7 from the communication hole 212a bored in the ceiling wall 212.

An outlet of the communicating hole 212a on the side of the air outflow channel 7, namely, the outlet of the bottom end of the nipple 212c, is located below the regulation portion 214c provided on the top end of the side wall 214. Therefore, after having passed through the air hole 214a, the air A passes downwardly through an opening formed between tapered surface 214e of regulation portion 214c and the outer circumferential surface of the nipple 212c. Subsequently, the air A blows on the top surface of the ceiling portion 216b of the float. Thereafter, the flow of the air A is reversed and the air flows from the bottom end of the nipple 212c into the communicating hole 212a.

Figure 10:
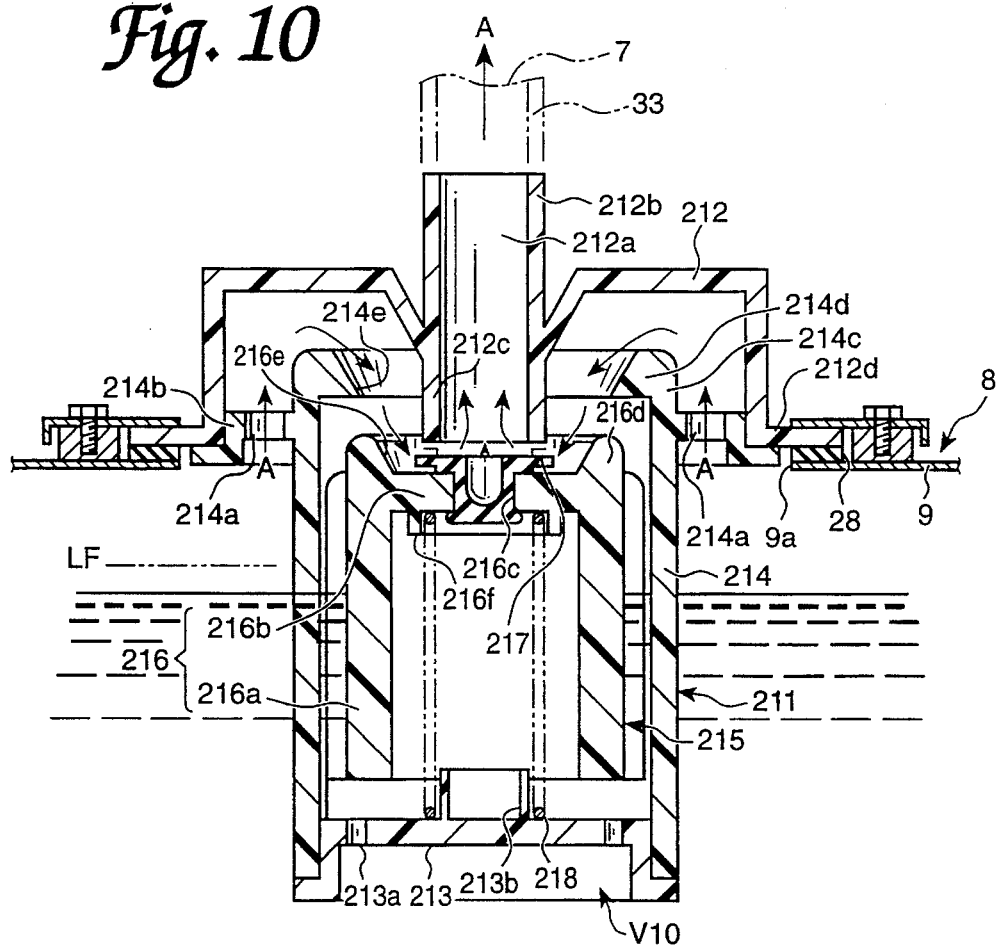
FIG. 10 is another sectional view of the third embodiment of the present invention for illustrating how the third embodiment of the present invention is used.

Therefore, the float 215 is subjected to the downward force when the air A blows on the top surface of the ceiling portion. Thus, even when the fuel F flows into the casing 211 from the through hole 213a bored in the bottom wall and a buoyant force is generated, the float is prevented from being lifted up by the air A, as illustrated in FIG. 10.

As the refueling speed becomes greater, the velocity of the flow of the air A becomes higher and thus the force preventing the float A from being lifted up become larger. Therefore, even if a strong buoyant force is generated, the float 215 can meet or overcome this force.

When the fuel level reaches the filled-up position LF, the float 215 is still acted upon in the downward direction by the air but is raised by the then-stronger buoyant force. As a result, the communicating hole 212a bored in the ceiling wall 212 is blocked up by the valve portion 217. Thus, the air A stops flowing out from the fuel tank 8. Thereafter, the internal pressure of the fuel tank 8 rises to a certain constant value. Consequently, a mechanism for automatically stopping a fuel injection gun on the side of the filler pipe 8a is actuated and the refueling operation stops once the fuel level rises in the filler pipe 8a.

Accordingly, in the case of the float valve V10 of this embodiment, when the fuel tank 8 is filled up with fuel, the air A can be made to flow smoothly and uninterruptedly from the fuel tank until the fuel level reaches a filled-up position. The fuel tank 8 can thus be smoothly filled up with fuel.

In the float valve V10 the substantially cylindrical rib 216d, which is formed on the outer circumferential edge part of the top surface of the ceiling portion 216b, has an inner tapered face 216e which narrows toward the bottom like a section of an inverted cone to define a dish-shaped cavity on the top of float 215. Thus, the air A smoothly flows to the top surface of the ceiling portion 216b of the float 215 over the tapered face 216e when it passes downwardly through an opening formed between tapered surface 214e of the regulation portion 214c and the outer circumferential surface of the nipple 212c, after having passed through the air hole 214c. Therefore, the air A blows easily onto the top surface of the float 215. Consequently, the downward force due to the air A pressing down the float 215 can be achieved with certainty.

Furthermore, in this third embodiment, the tapered face 214e on projecting ridge 214d corresponds to the conical tapered face 216e. This facilitates the flow of the air A onto the top surface of the float 215. Thus the air can act more smoothly.

Figure 11:
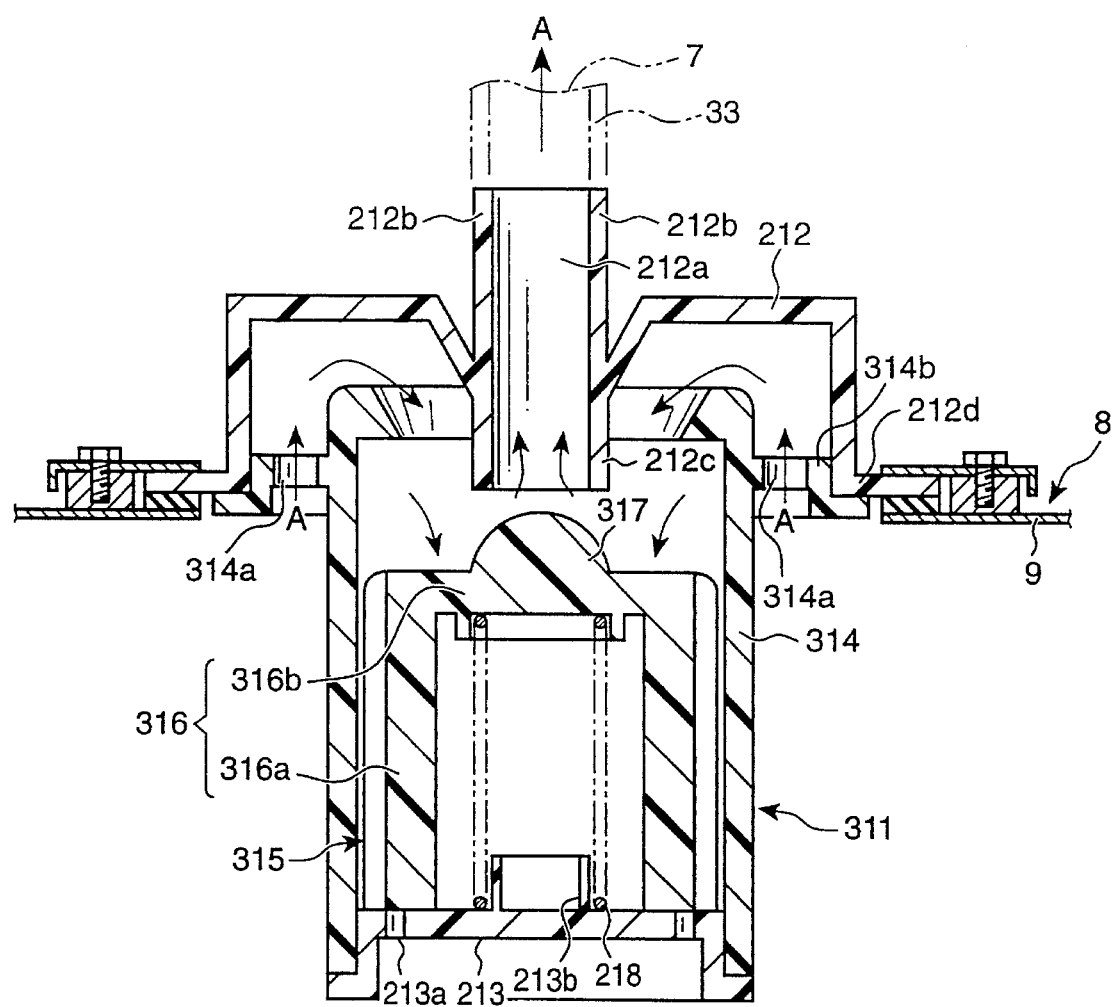
FIG. 11 is a sectional view of a fourth embodiment of the present invention.

A fourth embodiment is shown in FIG. 11. As shown in FIG. 11, even if no projecting ridge having a tapered face is provided on a regulation portion of a side wall 314, and no rib having a tapered face is provided on the top surface of a float 315, a downward flow of the air would blow onto the top surface of the float 315. The float can thus be prevented to some extent from being lifted up by the air.

In the embodiment of FIG. 11, an air hole 314a allowing the air A to flow into a casing 311 is bored in a flange 314b of the side wall 314. The flange 212d of the ceiling wall 212 may also be extended to the inner circumferential surface and welded to the side wall 314 and thereafter, an air hole may be bored in the extended flange of ceiling wall 212. Alternatively, instead of forming such a flange, a part of the top end of the side wall may be extended upwardly and connected to the ceiling wall 212 while another part of the top end of the side wall is provided with an opening for use as an air hole. The term flange portion as used in the claims is intended to cover all of the above alternatives.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A float valve disposed in a top of a fuel tank, for allowing air and fuel vapors displaced by fuel entering the tank during refilling to escape the tank via an outflow channel, and for preventing air and fuel vapors from flowing out of the tank when the fuel in the tank reaches a predetermined filled-up level, the float valve comprising:

an air passage for directing air and fuel vapors displaced from the fuel tank to a communicating hole providing communication with the outflow channel; and a float disposed between the air passage and the communicating hole, having a valve portion for blocking the communicating hole, and an air deflecting portion for deflecting air flowing from the air passage to the communicating hole so as to prevent the float from being floated upward.

2. A float valve according to claim 1, wherein said float comprises a first float portion and second float portion disposed inside the first float portion.

3. A float valve disposed in a top of a fuel tank, for allowing air and fuel vapors displaced by fuel entering the tank during refilling to escape the tank via an outflow channel, and for preventing air and fuel vapors from flowing out of the tank when the fuel in the tank reaches a predetermined filled-up level, the float valve comprising:

(1) a casing fixed to a top of the fuel tank, having
    (a) a ceiling wall with a communicating hole formed therein providing communication with the air outflow channel,
    (b) a bottom wall disposed under the ceiling wall, with a through hole formed therein for allowing fuel to enter the casing, and
    (c) a side wall connecting the ceiling wall with the bottom wall, with an air hole formed therein for allowing air and fuel vapors to enter the casing; and (2) a float movably disposed in the casing having
    (a) a valve portion constructed to block the communicating hole when the float is floated upward, and
    (b) an air deflecting portion facing said air hole to deflect air upward and force the float downward.

4. A float valve according to claim 2, wherein said air deflecting portion comprises an inclined surface portion extending substantially around a circumference of said float.

5. A float valve according to claim 2, wherein said float comprises a first float portion and a second float portion disposed inside the first float portion.

6. A float valve according to claim 2, wherein said side wall is substantially cylindrical.

7. A float valve according to claim 2, wherein said float further comprises:

a first float portion defining a chamber therein, and having a top containing said valve portion, having a side with an air hole therein for allowing air to enter the chamber, and having a through hole therein for allowing fuel to enter the chamber;

a second float portion movably-contained in the chamber; and a relief valve disposed in said valve portion and regulating communication between the outflow channel and the chamber when the valve portion blocks said communicating hole.

8. A float valve disposed in a top of a fuel tank, for allowing air and fuel vapors displaced by fuel entering the tank during refilling to escape the tank via an outflow channel, and for preventing air and fuel vapors from flowing out of the tank when the fuel in the tank reaches a predetermined filled-up level, the float valve comprising:

(1) a casing fixed to the top of the fuel tank, having
   (a) a ceiling wall, having an outer circumferential edge portion, and having a communicating hole formed therein communicating between the casing and said outflow channel,
   (b) a bottom wall, disposed under the ceiling wall, and having a through hole formed therein,
   (c) a substantially cylindrical side wall connecting the ceiling wall to the bottom wall, having an upper end, and
   (d) a flange portion between the ceiling wall and the side wall, extending outwards from a circumference of the upper end of the side wall, the flange portion having an air hole therein;

(2) a downwardly extending nipple having a diameter and a bottom end extending into the casing from the communicating hole, (3) a cylindrical regulation portion, disposed around the entire circumference of the upper end of the side wall, having a diameter greater than the diameter of the nipple, and projecting upwardly from the side wall and the flange past the bottom end of the nipple;

(4) a float disposed inside the casing having a top surface, and a valve portion disposed to block the nipple when the float is raised.

9. A float valve according to claim 8, wherein said top surface of said float comprises a cylindrical rib having a diameter greater than the diameter of the nipple, and a tapered surface which defines a dish-shaped cavity in the top surface.

10. A float according to claim 9, wherein said regulation portion has a tapered surface defined by a section of an inverted cone.

11. A float according to claim 9, wherein said tapered surface of said top surface is defined by a section of an inverted cone.

* * * * *